US011952973B1

(12) United States Patent
Stauffer

(10) Patent No.: US 11,952,973 B1
(45) Date of Patent: Apr. 9, 2024

(54) OCEAN WAVE DRILL BIT CORKSCREW ELECTRICITY GENERATOR

(71) Applicant: David William Stauffer, Portland, OR (US)

(72) Inventor: David William Stauffer, Portland, OR (US)

( * ) Notice: Subject to any disclaimer, the term of this patent is extended or adjusted under 35 U.S.C. 154(b) by 0 days.

(21) Appl. No.: 18/353,016

(22) Filed: Jul. 14, 2023

(51) Int. Cl.
*F03B 13/18* (2006.01)
*F03B 13/00* (2006.01)
*F03B 13/14* (2006.01)

(52) U.S. Cl.
CPC .......... *F03B 13/1815* (2013.01); *F03B 13/00* (2013.01); *F03B 13/14* (2013.01); *F03B 13/18* (2013.01)

(58) Field of Classification Search
CPC .......... F03B 13/00; F03B 13/12; F03B 13/14; F03B 13/18; F03B 13/1815
USPC ........................................................ 290/53, 54
See application file for complete search history.

(56) References Cited

U.S. PATENT DOCUMENTS

| | | | | |
|---|---|---|---|---|
| 5,440,175 A * | 8/1995 | Mayo, Jr. | F03B 15/02 | 290/53 |
| 6,006,518 A * | 12/1999 | Geary | F03B 17/065 | 290/53 |
| 7,105,942 B2 * | 9/2006 | Henriksen | F03B 17/061 | 290/53 |
| 8,120,196 B1 * | 2/2012 | Neese | F03B 13/262 | 290/53 |
| 8,575,775 B1 * | 11/2013 | Gonzalez-Carlo | F03B 17/062 | 290/53 |

* cited by examiner

*Primary Examiner* — Lars A Olson

(57) ABSTRACT

The inventor provides a pollution-free electricity generator that harnesses the weight and power of ocean waves to turn a shaft that runs an electricity generator. The inventor anchors the ocean wave drill bit corkscrew apparatus in the surf so that ocean waves roll over half of the drill bit corkscrew apparatus and turns a shaft that powers and electricity generator.

3 Claims, 13 Drawing Sheets

OCEAN WAVE DRILL BIT CORKSCREW ELECTRICITY GENERATOR

(b) BACKGROUND OF THE INVENTION

For many years, scientists have tried to harness the great power of ocean waves to produce electricity. They tried to make metal buoys that bobbed up and down to produce electricity. None of those efforts were successful in actually accomplishing the production of continuous consistent electricity production. In addition, the exposure of metal to salt water corroded the metal so that the structure deteriorated. This invention claims a different structure that does not use bobbing buoys but will produce continuous, consistent electricity using plastic parts that will take a much longer time to corrode.

The general theory of this invention derives from the fact that continuous ocean waves start about 30 to 100 meters from the ocean shore depending on the slope of the shore, the slope of the ocean floor leading up to the shore, and the wind blowing the waves into the shore. Instead of making buoys that bob up and down with the waves, this invention has a 30 to 100-meter drive shaft that has facets so that it looks like a long drill bit corkscrew. The drill bit corkscrew runs perpendicular to the shore. The waves run over the length of the drive shaft and put weight on the facets of the drill bit corkscrew drive shaft to turn the drive shaft. The drive shaft then turns the turbines of an electricity generator on dry land on the shore and produces continuous, consistent electricity.

Any person that has walked in the surf of the ocean knows the feel of the weight of the wave and the power of wave motion. Splashing waves are the purest model of the moving force of this invention; however, the weight of the water on top of half of the drill bit corkscrew apparatus provides the same weight even if the apparatus is underneath the water.

Adding extra weight to the top of the ocean water adds extra weight to every level of water that is lower than the top of the water.

This application shows one apparatus with one turning drive shaft; however, this application also claims multiple copies of the apparatus that can be hooked together to generate more electricity more consistently. The structure of the multiple units will be that, when one segment of one of the units needs repair, that unit will be taken offline for repair while the other units continue to generate electricity.

Previous attempts at producing an electricity generator suffered from using metal that was corroded by salt water. This invention will not have any metal parts that are exposed to salt water; instead, the invention will use plastic parts that corrode at a much slower rate.

(1) Fields of the invention: pollution-free electricity generation, powering a generator with ocean waves, structures to capture the power and weight of ocean waves to produce electricity, telescoping power trains.

(2) Description of Related Art including information disclosed under 37 CFR 1.97 and 1.98: None.

The instant invention solves one of America's most important environmental problems: At present, there is no structure that can harness the up and down motion of ocean waves to consistently run a generator.

Intermittent wave energy is not acceptable to utility companies, so utility companies do not want to distribute wave-powered electricity. The utility companies do not want to have the "feast and famine" supply, so they do not sign up for the wave-powered electricity—which frustrates one of President Biden's goals of converting to clean energy—wave energy—in the near future.

The Application of Lee" case states:

"Patent claims may be sustained in a proper case because of the fact of combination rather than the novelty of any particular element."

Application of Lee, Cust & Pat App. 1951, 193 F.2d 186, 39C.C.RA. 752, 92USP.Q.131.

There are 8 elements of the invention which are not obvious, and which are novel enough, either alone or in Inventor Stauffer's new combination, to be patentable, i.e., to deserve a patent grant. Inventor Stauffer has eight novel patentable elements, which is many more than the one novel element in an old combination of elements that will justify the award of a patent to Inventor Stauffer:

A. A structure running perpendicular to the ocean shore that captures the power and weight of ocean waves as they wash toward shore and uses that power and weight to turn the turbines of an electricity generator.

B. A structure that provides a roof over half of the drill bit corkscrew structure so that the weight and power of the ocean waves falls on only half of the drill bit corkscrew structure so that the clockwise turning motion is not offset by the power and weight of the ocean wave going in the opposite counterclockwise direction.

C. The full length of the ocean wave—from its start in the ocean to its breaking on the shore—is used to turn the drill bit corkscrew structure.

D. Because the ocean waves get closer to shore and are higher in the water at high tide, and then farther from shore and lower in the water at low tide, a pollution-free-no-electricity-using structure to link the drill bit corkscrew structure to the on-shore electrical generator at different positions in the water is provided.

E. The in-ocean part of the structure will be made of plastic parts which will not corrode in salt water as easily as metal parts.

F. There will be multiple units of the drill bit corkscrews that are linked together so that any one may be taken off-line without stopping the production of electricity of the other units when repairs are needed for the one unit that is taken offline.

G. The generator will have both a tilting base and a universal joint to modify the angle of the drill bit corkscrew drive shaft to adjust for different angles between high tide and low tide.

H. The generator's electronic and mechanical parts will be on shore so that they are not exposed to the corrosion of salt water.

BRIEF SUMMARY OF THE INVENTION

A zero-fossil-fuel-using non-polluting apparatus to use wave power to generate a steady flow of hydroelectricity.

BRIEF DESCRIPTION OF THE DRAWINGS

FIG. 3 shows how the curved roof u on the Side a side will direct the Side a water to Side b rather than allowing that water to go off to the outside of Side a.

DESCRIPTION OF THE DRAWINGS

Figure 1:
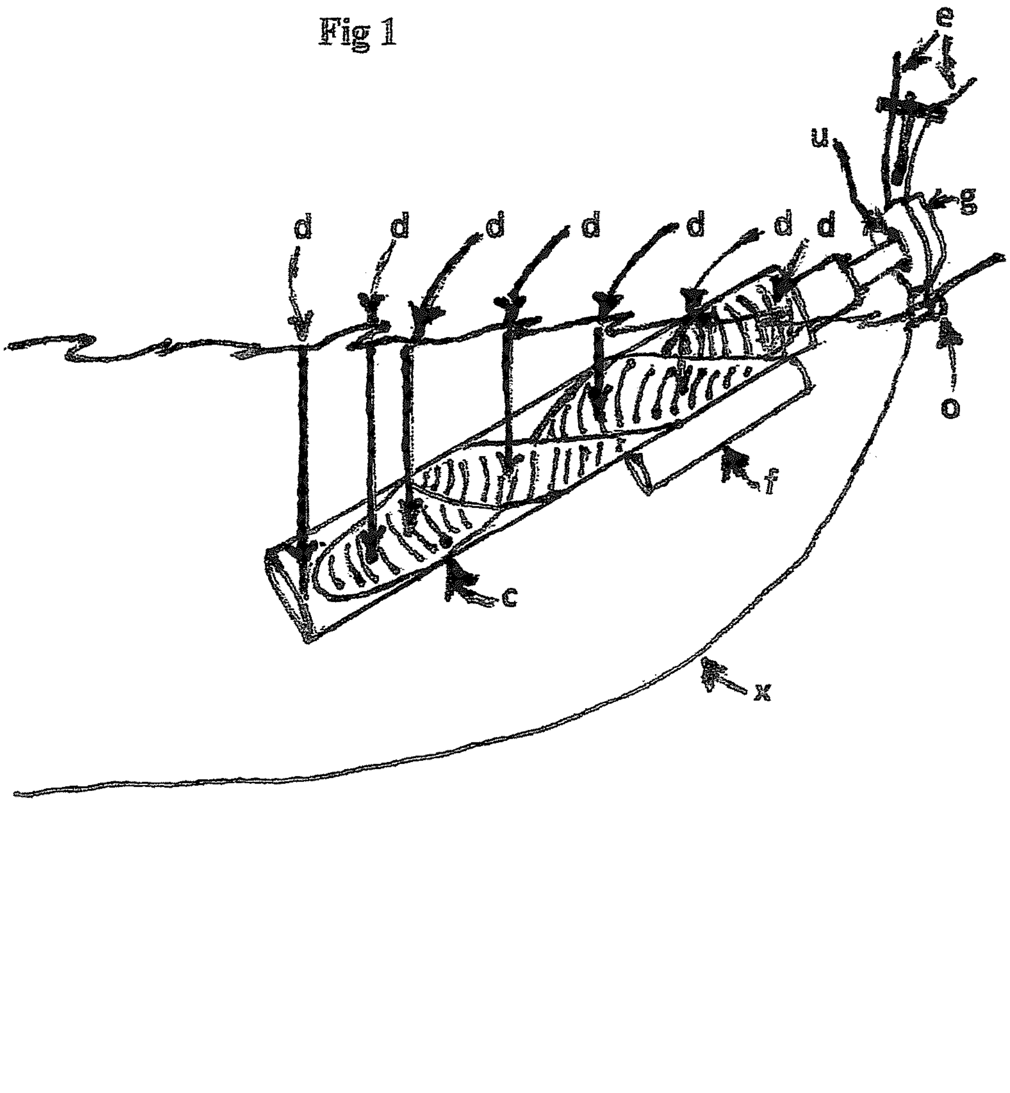
FIG. 1 shows how ocean waves (d) at high tide will be dropped on the length of the drill bit structure to continuously turn the Drill Bit Corkscrew (c) to continuously power a generator (g) to generate electricity to outgoing wires (e)

The Ocean Wave Drill Bit Corkscrew Electricity Generator Apparatus (hereafter "Drill Bit Corkscrew") has the curving structure of a drill bit. FIG. 1 shows how ocean waves (d) at high tide will be dropped on the length of the drill bit structure to continuously turn the Drill Bit Corkscrew (c) to continuously power a generator (g) to generate electricity to outgoing wires (e). A float (f) will keep the Ocean Wave Drill Bit Corkscrew Electricity Generator Apparatus (c) above the ocean floor (x) at high tide. The Ocean Wave Drill Bit Corkscrew Electricity Generator Apparatus (c) will generate continuous consistent electricity. The generator's dry-land latch (o) is attached to the shore (above water) and can swivel so that the connection to the generator is always at a right angle even though the shaft (c) rises and falls with the tide. In addition, there will be a universal joint u to compensate for variable angles of entry of the drive shaft c into the generator g. One liter of water at room temperature (70° F./21° C.) weighs approximately 1 kilogram (35.2 ounces or 2.2 lb). 100 liters of water, then, weighs 220 lbs. Typically, every breaking ocean wave that breaks near the shore lifts about 100 liters of water up anywhere from one foot to five feet. The weight of that water coming back down by the force of gravity can turn a corkscrew-like, or drill-bit-like apparatus so that pollution-free electricity can be generated. The inventor provides a Wave Drill Bit Corkscrew Electricity Generator apparatus that produces electricity from waves falling down and moving over the corkscrew-like or drill-bit-like apparatus so that the corkscrew-like or drill-bit-like apparatus turns a shaft, which turns the turbines of a generator and produces continuous pollution-free electricity.

Figure 2:
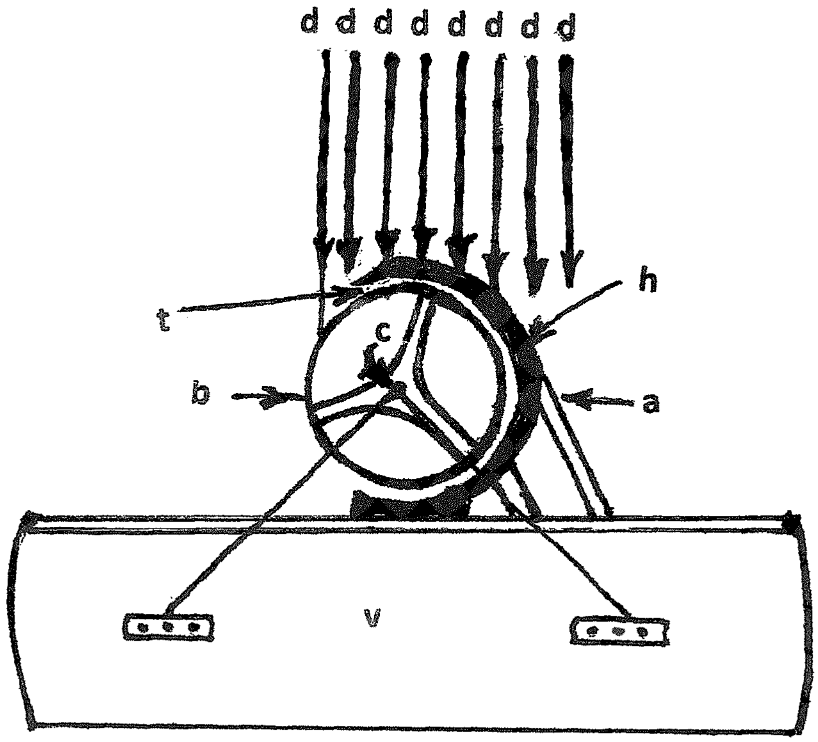
FIG. 2: Vectors that show the downward direction of waves to power the Wave Drill Bit Corkscrew Electricity Generator Apparatus. The Figure looks at the end view of the Drill Bit Corkscrew structure (c) that turns as the weight of water waves washes over Side b of the length of the Drill Bit Corkscrew by each passing wave (d).

FIG. 2: Vectors that show the downward direction of waves to power the Wave Drill Bit Corkscrew Electricity Generator Apparatus. The Figure looks at the end view of the Drill Bit Corkscrew structure (c) that turns as the weight of water waves washes over Side b of the length of the Drill Bit Corkscrew by each passing wave (d). The other half (Side a) will not have water dropped on it because there is a roof over that half (roof h on Side a in FIG. 2) that extends slightly beyond the midpoint of the circle so that the water pressure under the roof will be less on the part of the drill Bit Corkscrew that is covered by the roof side (a). The roof (h) will have an area of smaller air pressure (t) so that the Drill Bit Corkscrew will have less pressure to turn counter to the pressure on side b. Therefore, the movement of the unroofed side of the Drill Bit Corkscrew will not be counteracted by water weight on the roofed side of the Drill Bit Corkscrew. The roof will be curved (see FIG. 3) to direct the part of the wave that hits the roof to the Side b facets to further increase the weight of the water on Side b in order to create more power to turn the turbines to make continuous electricity.

The roof (h) will extend 10 degrees over the top of Side b so that there is an air bubble underneath the roof which will allow the Drill Bit Corkscrew to move clockwise without being impeded by counterclockwise water pressure underneath the roof (h).

Figure 8:
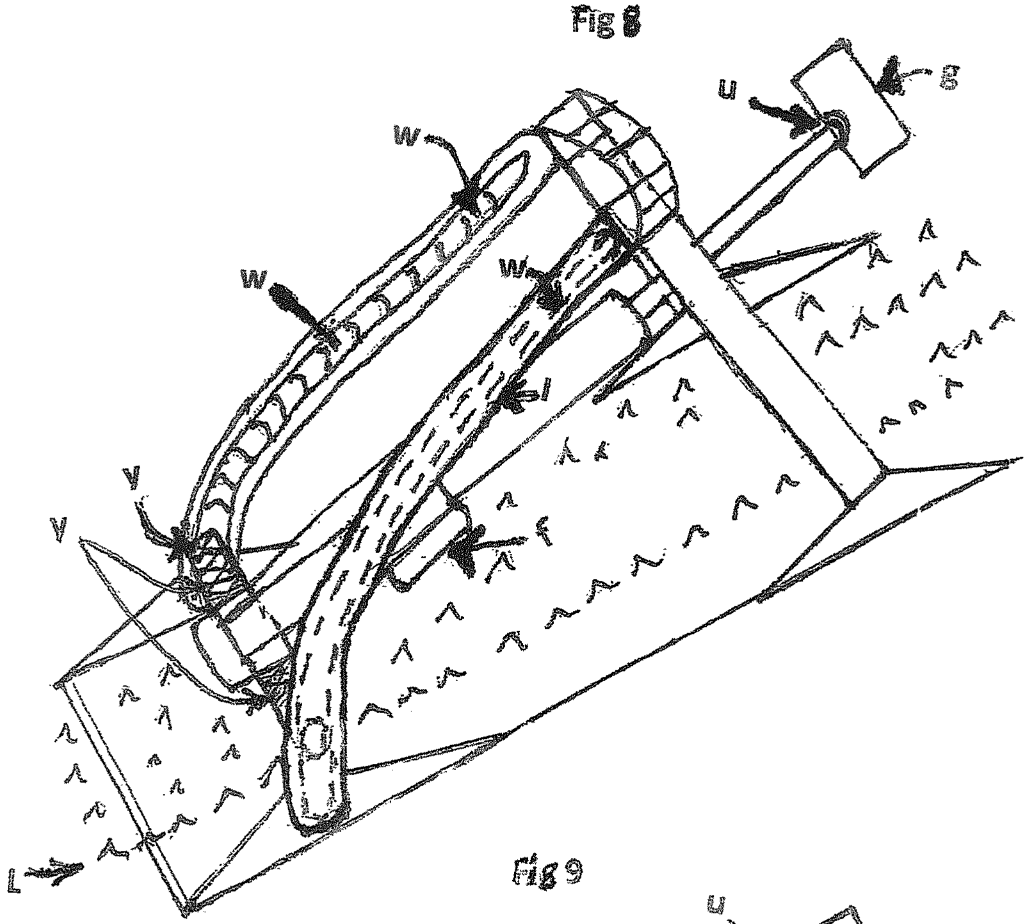
FIGS. 8 and 9 are structures which show how the structure moves the Drill Bit Corkscrew structure to compensate for the fact that high tides raise the level of the ocean water and low tides lower the level of the ocean water.
Figure 9:
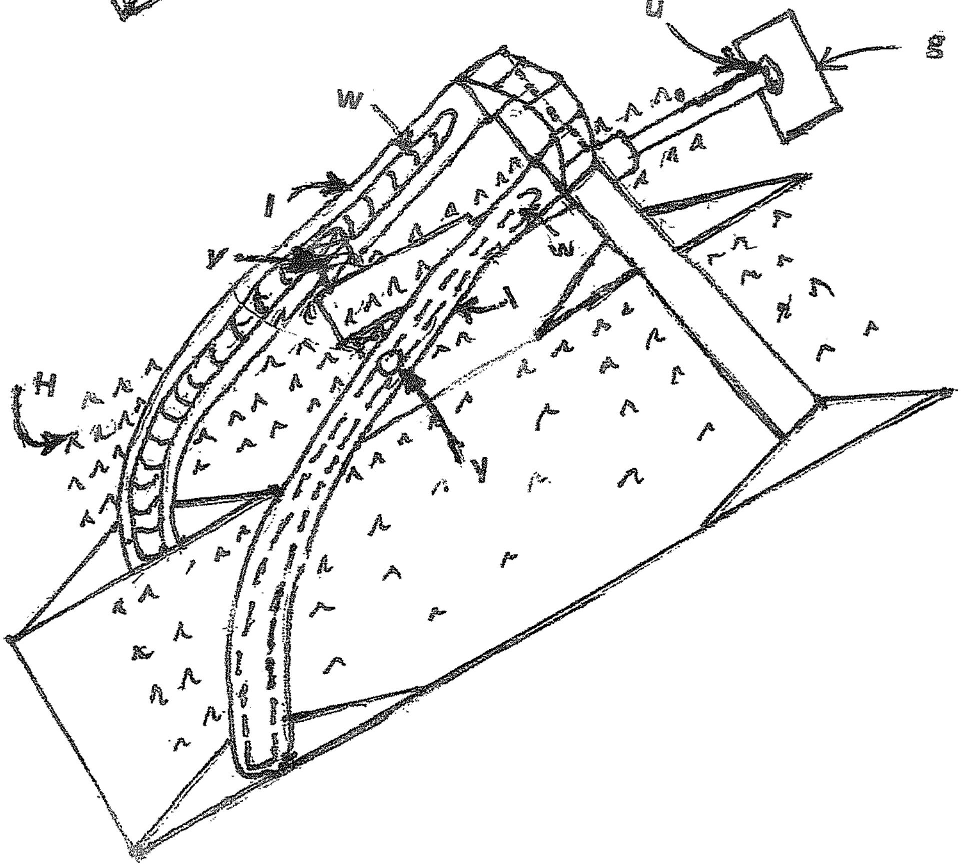

The roof (h) will be attached to a sturdy structure (v) to keep the roof in the right position over the drill bit corkscrew (see FIGS. 8 and 9). In addition, the roof (as further shown in FIG. 3) shall have a peak and sloping shape so that water weight on the Side a side will be directed over to facets of the Drill Bit Corkscrew on Side b and create more pressure to turn the drive shaft (c in FIG. 3).

Figure 3:
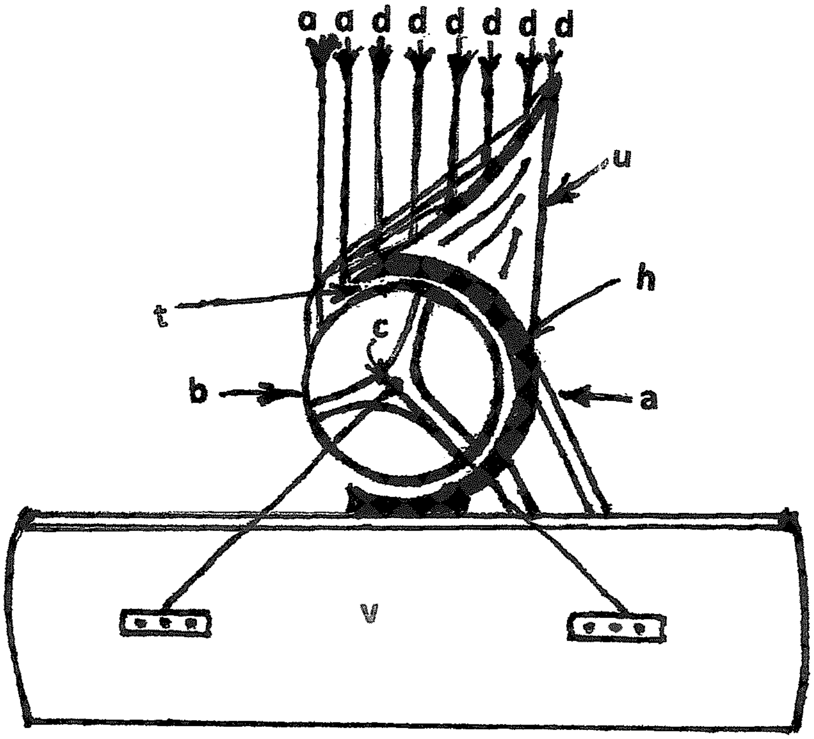

FIG. 3: It is essential that the waves hit the curved and pointy roof (h in FIG. 3) from the top, so the roof (h) must be firmly attached to the support structure (v in FIGS. 2 and 3) to keep the best orientation to side b to capture all the water that falls on side a so that it is directed to side b. FIG. 3 shows how the curved roof on the side a side will direct the side a water to Side b rather than allowing that water to go off to the outside of side a.

Figure 4:
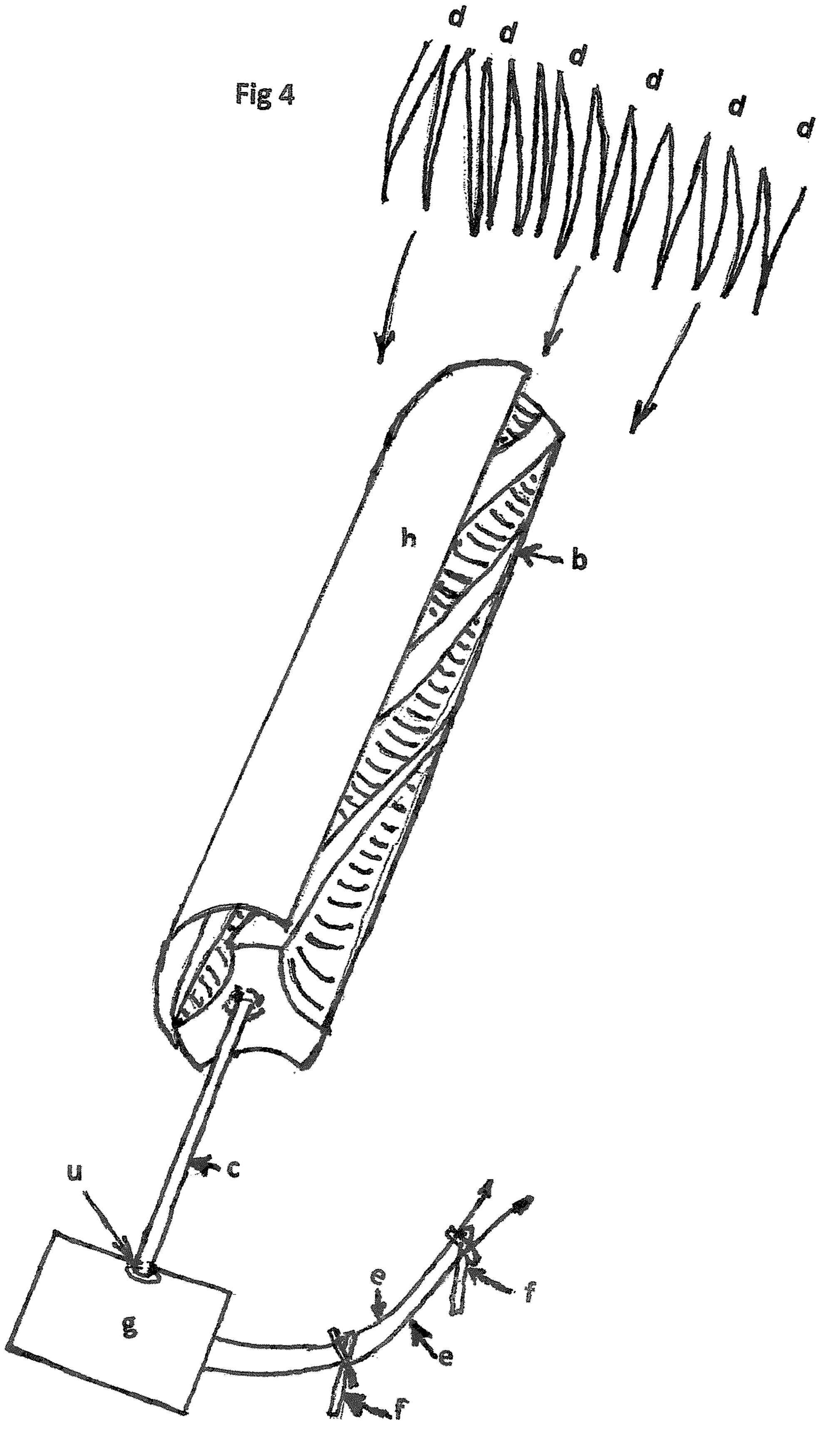
FIG. 4 shows a length view of the Ocean Wave Drill Bit Corkscrew Electricity Generator Apparatus which shows that it turns a shaft (c) to power the generator (g).

FIG. 4: A length view of the Wave Drill Bit Corkscrew Electricity Generator Apparatus which shows that it turns a shaft (c) to power the generator (g). All ocean shores have waves that wash onto the shore in a successive, continuous manner. The drill bit corkscrew has facets (a) that are long enough so that when one wave is subsiding and flowing back into the ocean, another wave is just starting and hitting the part of the corkscrew that is nearest the new ocean waves so there is a continuous turning of the entire length of the corkscrew and so that there is a continuous source of water weight to turn the corkscrew and generate continuous electricity.

Waves that have broken on the shore will then wash back to the ocean and provide weight on the Drill Bit Corkscrew facets that is similar to the waves coming from the ocean.

The length of the Drill Bit Corkscrew will vary (e.g., 50 meters in FIGS. 4, 5, 6. and 7 as an example) depending on how long the waves travel from their formation to their ending point on the shore. Each Drill Bit Corkscrew will be long enough so that it can utilize most of each wave.

When the ocean is calm and there is little wind, much of the beginning part of the Drill Bit Corkscrew may not be used; however, the apparatus will be able to utilize the waves that occur even if they are waves closer to the shore. The apparatus will float (see floats f in FIGS. 1, 7 and 8) with the tides which is a mechanism for raising the apparatus up to the top part of the ocean during high tide—to catch the waves at the top of the water. At low tide, the float structures (f in FIGS. 1, 7 and 8) will not have enough water to float, so the Drill Bit Corkscrew will sink to the ocean floor but the first half of the top of the Drill Bit Corkscrew will continue to be under the waves even at low tide (see FIG. 7).

FIG. 4 shows the side view of the Drill Bit Corkscrew; it shows how the roof (h) shields one side (the a side) of the length of the Drill Bit Corkscrew from the weight of the waves while allowing the other half of the Drill Bit Corkscrew (on the b side) to be pushed and rotated by the weight of the waves. The roof (h) will extend more than halfway across the top of the Drill Bit Corkscrew (see FIG. 3) so that the weight of the water on Side a will not decrease the turning of the drill Bit Corkscrew. The b side will also have a thin wire mesh covering (not shown) so that fish and humans will be protected from the moving “drill bit” blades and so that fish and humans will not be cut by the moving blades as the blades rotate with the water weight.

Another aspect of ocean waves is that the waves will break farther out in the ocean at low tide and closer to the shore at high tide. The Drill Bit Corkscrew structure will move the Drill Bit Corkscrew apparatus farther towards the ocean at low tide and closer to the shore at high tide. See FIGS. 7, 8 and 9 for the structure that will send the Drill Bit Corkscrew structure closer to the generator at high tide and farther from the generator at low tide.

Figure 5:
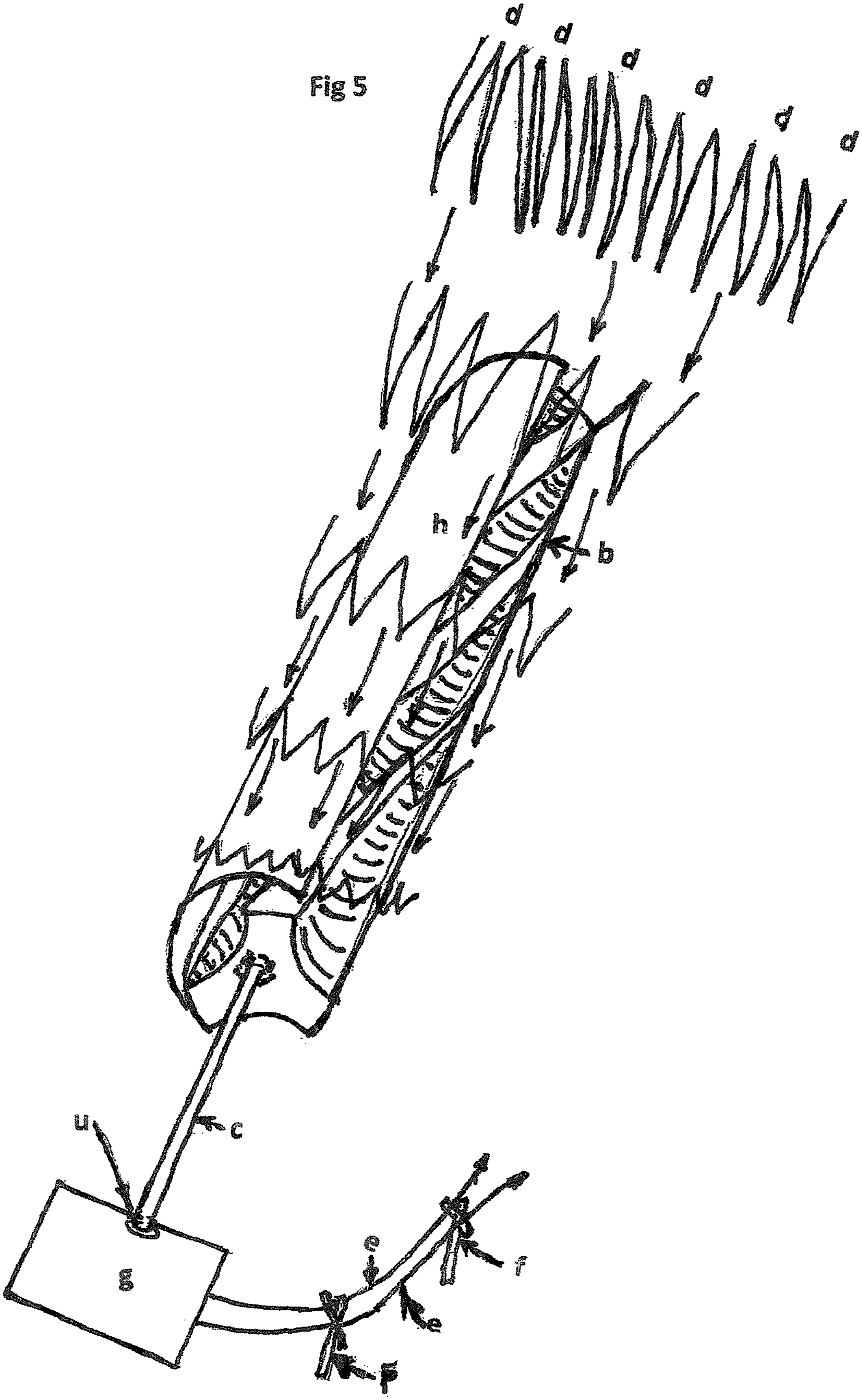
FIG. 5: A view of the length of the Drill Bit Corkscrew (a) and the roof (h) over half of the length of the Drill Bit Corkscrew with many waves (d) washing towards the shore and getting smaller as they get nearer the shore.

FIG. 5: A view of the length of the Drill Bit Corkscrew (a) and the roof (h) over half of the length of the Drill Bit Corkscrew with many waves (d) washing towards the shore and getting smaller as they get nearer the shore. The figure also shows a turning shaft (c) that protrudes from the end of the Drill Bit Corkscrew and goes into the generator (g) which is planted on the shore—even at low tide—to turn the turbines of the generator and create pollution-free electricity which travels to houses and buildings on shore by electrical wires (e) strung on poles (f).

The weight of the first wave will turn the entire length of the Drill Bit Corkscrew, and each succeeding wave will continue the turning of the Drill Bit Corkscrew so that electricity will be continuously generated. In addition, waves of water that are returning from the shore will also add water weight to turn the Drill Bit Corkscrew. The roof (h) allows wave water to turn the Drill Bit Corkscrew in one direction while preventing the wave water from stopping that turning by preventing the water from putting weight on the other half of the Drill Bit Corkscrew (see FIG. 3). The weight of the water above the Drill Bit Corkscrew will cause the Drill Bit Corkscrew to continue to turn the generator to create continuous electricity.

The generator will be installed up on the beach (out of the water) so that there are no metal or electronic parts that are exposed to the ocean’s salt water. When the ocean is at high tide, the Drill Bit corkscrew apparatus will be near the top of the surface of the water. The only weight on the Drill Bit Corkscrew apparatus will be the water weight above it. The entire structure shall be made of a plastic material so that the salt water of the ocean does not degrade the apparatus and the generator (g) will be enclosed in a water-tight enclosure to prevent salt water from corroding the electric generator parts.

When the ocean is at low tide, the Drill Bit Corkscrew apparatus will be near the top of the surface of the water so that each wave will wash over the Drill Bit Corkscrew and put water weight on the Drill Bit Corkscrew to continuously turn the apparatus to create a consistent supply of electricity. When one wave has gotten to the end point closest to the shoreline, another wave will be starting at the farthest point from shore—to keep the Drill Bit Corkscrew in constant motion. In addition, waves of water that are returning from the shore will also add water weight to turn the Drill Bit Corkscrew.

Figure 6:
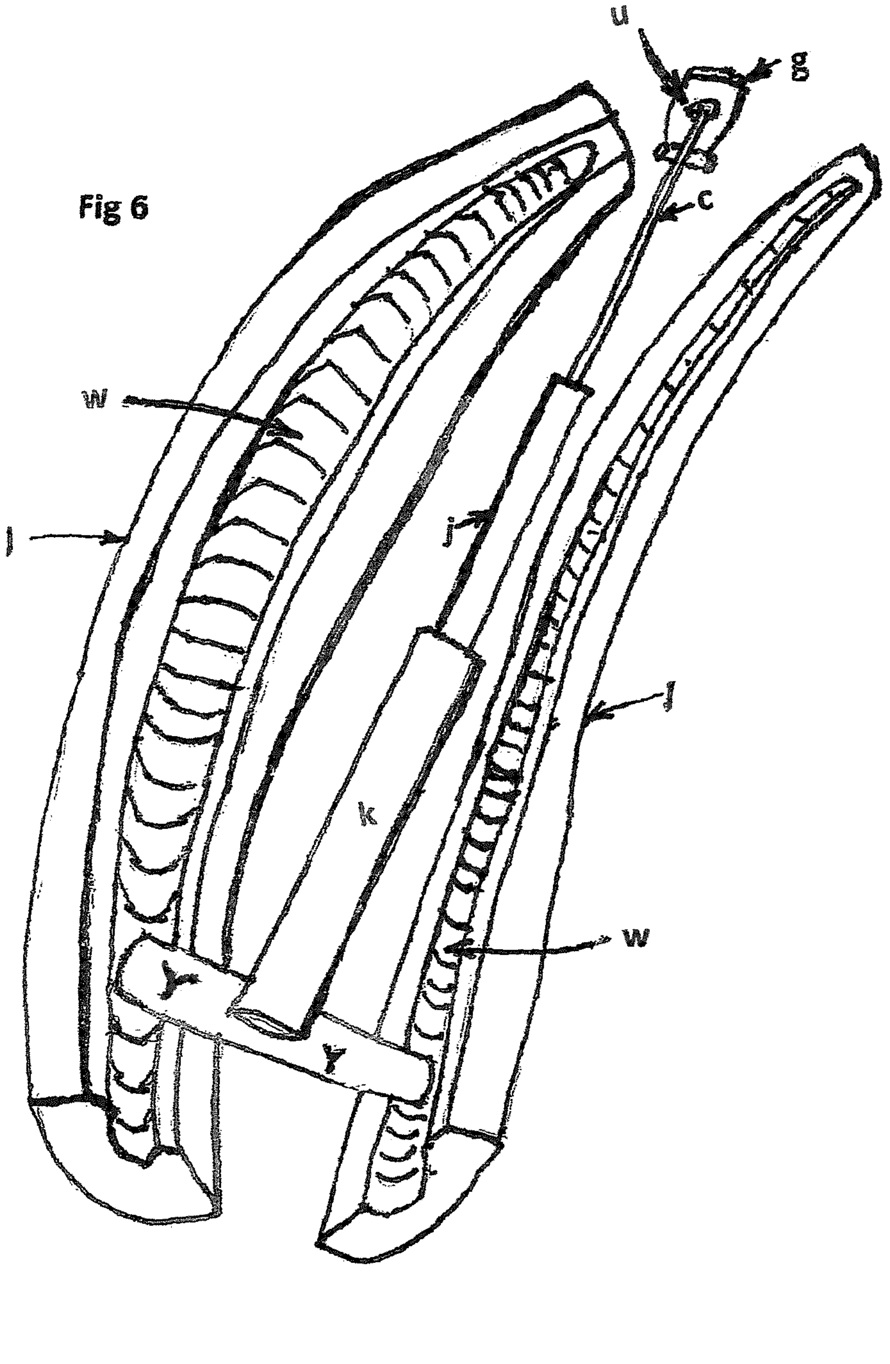
FIG. 6: The view shows the grooved pathways (w) in which the baffle (y) ends are confined in the support structure (I) so that when the float(s) (f) rise up to the top of the water, the baffle (with the Apparatus attached) will also rise as the tide lifts the water.

FIG. 6: The view shows the grooved pathways (w) in which the baffle (y) ends are confined in the support structure (I) so that when the float(s) (f) rise up to the top of the water, the baffle (with the Apparatus attached) will also rise as the tide lifts the water. The two pathways will also force the floats to go closer to the shore at high tide, and farther away from the shore at low tide. Therefore, the floats and the support structure pathways will move to compensate for the high and low tides-all without using any controlling machinery or burning any fossil fuels. Also, see w in FIGS. 6, 7, 8, and 9.

Figure 7:
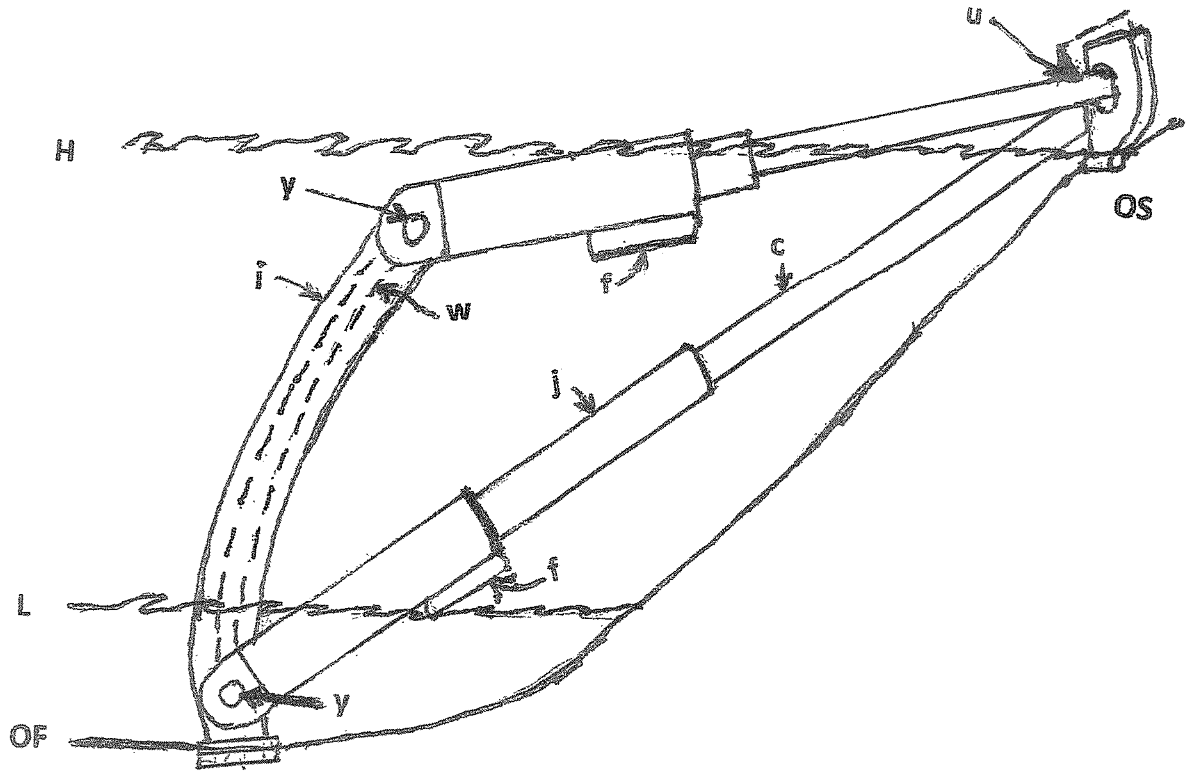
FIG. 7 The Drill Bit Corkscrew apparatus is depicted at two different times: the H water level at the top is the time of High Tide and the L water level near the bottom is Low Tide.

FIG. 7 The Drill Bit Corkscrew apparatus is depicted at two different times: the H water level at the top is the time of High Tide and the L water level near the bottom is Low Tide. The two times are presented together to show how the Drill Bit Corkscrew rises with the high tide, gets closer to the shore, and then falls to the Low Tide Level—and gets farther from the shore. When the tide is high, there is enough water to lift the float (f), so the Drill Bit Corkscrew apparatus structure rises to its highest point to catch the breaking waves and the shaft (c) is out of the water so that it can connect to the generator (g) which is on the shore and out of the water. As depicted in FIG. 7, waves (d) wash over most of the length of the Drill Bit Corkscrew apparatus to create electricity. At the low tide level, there is not enough water to lift the float (f) so the Drill Bit Corkscrew apparatus structure sinks to its lowest point to catch the breaking waves and the shaft (c) is telescoped out of the water so that it can connect to the generator (g) which is on the shore and out of the water. Waves wash over the beginning half of the length of the Drill Bit Corkscrew apparatus to create electricity.

The size and measurements of the Drill Bit Corkscrew Apparatus will vary with each beach and the distance between the breaking waves at low tide and the shore.

This view of the apparatus is in the water at low tide (L) and also at high tide (H) which are, obviously, two different times many hours apart. The views are presented together so that the reader can compare the positions of the Drill Bit Corkscrew Apparatus when the float (f) rises up (with the Drill Bit Corkscrew apparatus attached) the pathway with the rising tide, and then falls down (with the Drill Bit and Corkscrew apparatus attached) the same pathway with the falling tide. At low tide (L), the apparatus and the telescoping shaft will be lower with the float (f) not floating and the telescoping shaft (j and c) will be fully extended to be able to reach and power the generator (g). Still, at low tide, waves will be washing over the first part of the Drill Bit and Corkscrew Apparatus to keep the shaft turning.

At high tide (H), the Drill Bit and Corkscrew Apparatus has followed the pathway (w) higher and closer to the shore and to the generator (g), so the telescoping shaft segments (j and c) are shortened, and higher, and waves are washing over most of the Apparatus. The swivel (o) will shift the generator angle so that the shaft (c) can hook up to the generator at the proper angle for the generator to receive the turning power shaft. In addition, the telescoping shaft segment c will attach to the generator g by a universal joint u (See FIG. 14) that will effectively transmit the torque of the telescoping segment c to the generator g at all times when the Drill Bit Corkscrew apparatus is shifting between high tide and low tide and back to high tide.

Figure 10:
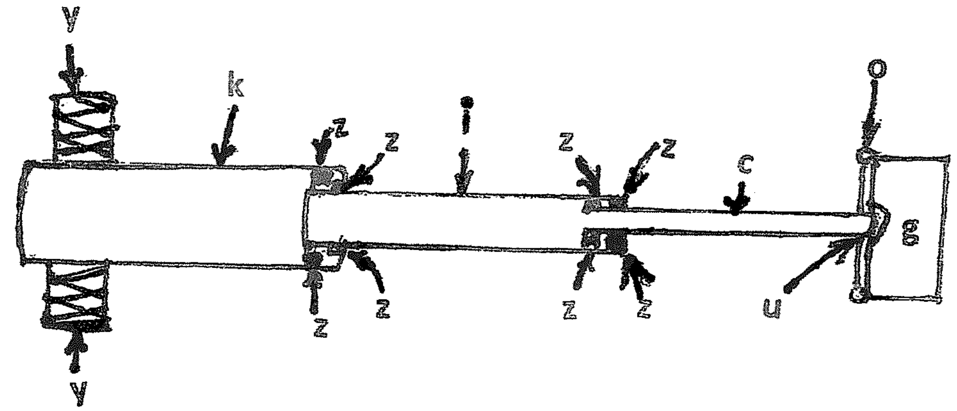
FIGS. 10, 11, and 12: The FIGURES show how the c part of the telescoping shaft will be able to move into the j part of the telescoping shaft to make the shaft shorter.
Figure 11:
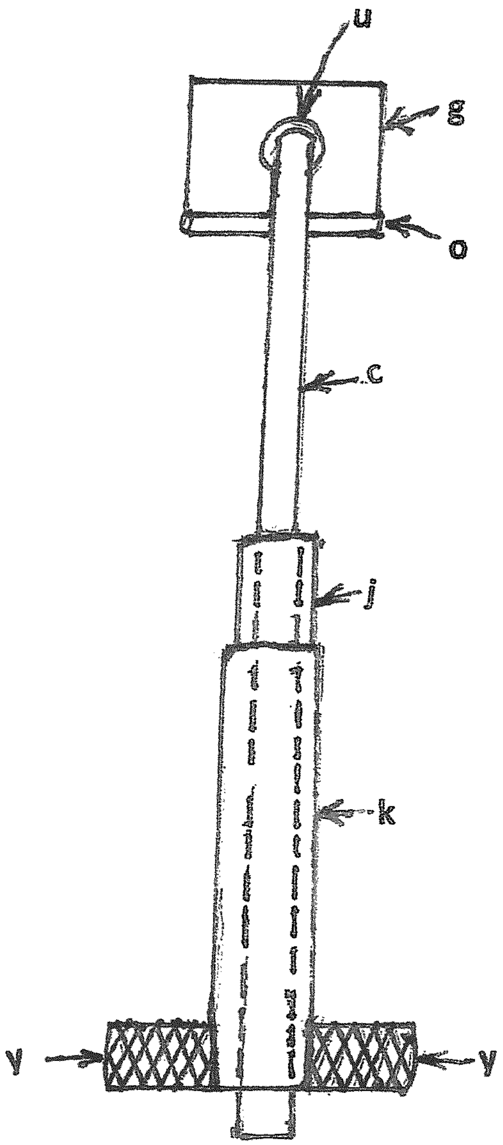
Figure 12:
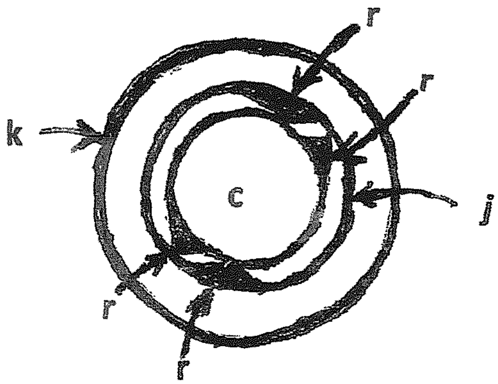

FIGS. 8 and 9. FIGS. 8 and 9 are structures designed to compensate for the fact that high tides raise the level of the ocean water and low tides lower the level of the ocean water. Also, the ocean water waves hit the shoreline at a higher level at high tide and those waves break closer to the shore at high tide. Then, at low tide, the waves break at a lower level, and farther from shore. Therefore, the Drill Bit Corkscrew Apparatus needs to be raised at high tide and moved closer to the shore at high tide. The FIGS. 8 and 9 structure will be used to perform the needed movements: up and towards the shore at high tide, and lower, and away from shore at low tide. See the support structure (I in FIGS. 6, 7, 8 and 9). The structures in FIGS. 6, 7, 8 and 9 accomplish both of those objectives because the baffle (y) ends are confined to the two pathways (w in FIGS. 6, 7, 8 and 9) in the support structure (I) so that when the floats (f) rise up to the top of the water, the baffle (with the Apparatus attached) will also rise as the tide lifts the water. The same pathways will also direct the Drill Bit Corkscrew down the pathways (w) as the water height decreases in the ocean's transition from high tide to low tide. The two pathways (w in FIGS. 6, 7, 8 and 9) will also force the floats to go closer to the shore at high tide, and farther away from the shore at low tide. Therefore, the floats and the support structure pathways will move to compensate for the high and low tides—all without using any controlling machinery or burning any fossil fuels. FIGS. 8 and 9 show a support structure with four main poles attached to the ocean floor and two curved pathways capable of guiding the baffles (y) that are depicted in FIGS. 7, 8 and 9. The Drill Bit Corkscrew Apparatus is guided along the two pathways by the floating action of the floats (f in FIGS. 7, 8 and 9) so that the floats move the Apparatus up to the top of the ocean, and towards the shore, at high tide. Then, when the ocean lowers the water level at low tide, the floats float downward and the apparatus moves along the pathways so that the Drill Bit Corkscrew Apparatus is lower in the water and farther from the shore. These movements require that a telescoping shaft that is turned by the apparatus gets shorter at high tide and longer at low tide so that the power shaft (c) can get shorter and longer as the apparatus moves closer to, or farther from, the generator (g). The structures for the telescoping of the shaft are described in FIGS. 10, 11 and 12. 44 FIGS. 10, 11, and 12: In FIGS. 10 and 11, the c part of the telescoping shaft will be able to move into the j part of the telescoping shaft to make the shaft shorter. Baffles (z's) in FIG. 10 will prevent the telescoping part from detaching when low tide extends the telescoping parts. In FIG. 12, an end view of the telescoping shaft shows that there are baffles (r) that fit together to assure that the j and c parts of the telescoping shaft will continue to exert pressure to turn the shaft in a clockwise direction to turn the generator (g). Baffles z will allow telescoping to extend the drive shaft, but also allow the telescoping part to be pushed back together when the floats (f) rise with the rising tide. The baffles (r's) in FIG. 12 are affixed to the telescoping parts so that when the Apparatus turns, the J and c segments will also turn with the same power.

The shaft will be attached to the generator (g) on dry land, so the generator will have to accept the shaft at a slightly different angle at high tide and low tide, so the generator will be on a swiveling base (o) that will allow it to change the angle at which it connects to the shaft. See FIGS. 8, 9, 10 and 11. In addition, the telescoping shaft segment c will attach to the generator g by a universal joint u that will effectively transmit the torque of the telescoping segment c to the generator g at all times when the Drill Bit Corkscrew apparatus is shifting between high tide and low tide and back to high tide. See FIG. 14.

To summarize, the c part of the telescoping shaft will be able to collapse into the j part of the telescoping shaft to make the c shaft shorter. The z baffles will prevent the telescoping parts from falling apart as the float (f) pulls the j and c segments apart to extend the length of the c shaft so that it can reach the generator (g) at low tide. Also, at high tide the j and c structures will telescopically collapse so that the c shaft can be short enough to make a short connection with the generator (g). When low tide happens again, the j and c will telescope out so that the c shaft can be long enough to make the long connection with the generator (g).

Figure 13:
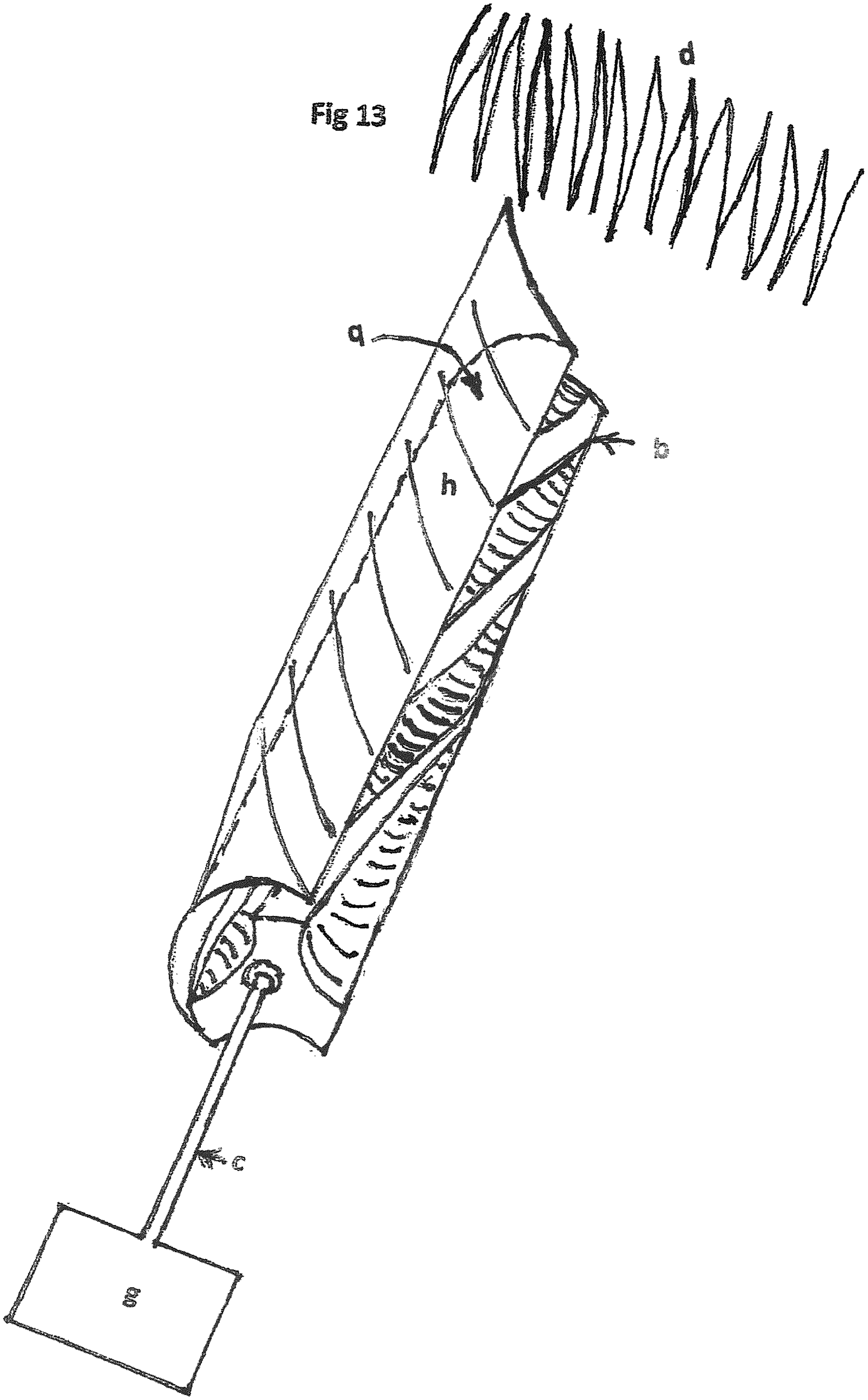
FIG. 13: Shows the side view of the Drill Bit Corkscrew that was shown in FIGS. 4 and 5 with the addition of a peak and sloping shape (q) on top of roof (h) that shields one side (the a side) of the length of the Drill Bit Corkscrew from the weight of the waves while allowing the water weight that comes down on the a side to run off onto the b side to put extra weight on the facets of half of the Drill Bit Corkscrew (on the b side) to be pushed and rotated by the weight of the waves.

FIG. 13: FIG. 13 shows the side view of the Drill Bit Corkscrew that was shown in FIGS. 4 and 5 with the addition of a peak and sloping shape (q) on top of roof (h) that shields one side (the a side) of the length of the Drill Bit Corkscrew from the weight of the waves while allowing the water weight that comes down on the a side to run off onto the b side to put extra weight on the facets of half of the Drill Bit Corkscrew (on the b side) to be pushed and rotated by the weight of the waves. The roof (h) will extend more than halfway across the top of the Drill Bit Corkscrew (see FIG. 3) so that the weight of the water on side a will not decrease the turning of the Drill Bit Corkscrew. The b side will also have a thin wire mesh covering (not shown).

Figure 14:
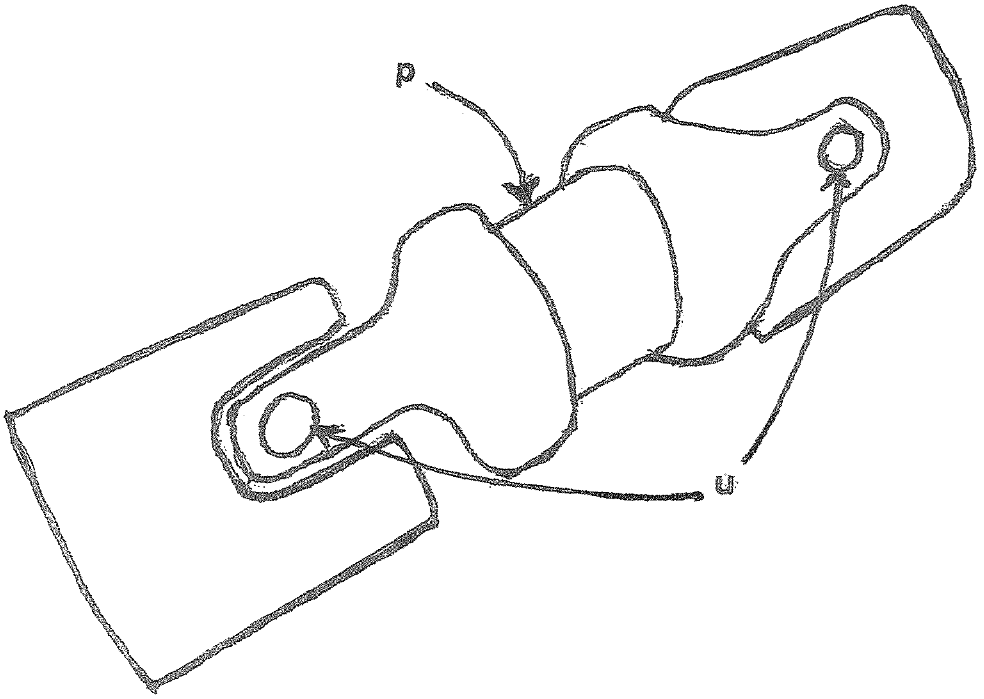
FIG. 14: Universal joint u with extension p will connect the shaft c to the generator g and allow for variable angles so that the torque from the Drill Bit Corkscrew, c can turn the turbines of the generator at a speed which is sufficient to generate electricity. In addition, the telescoping shaft segment c will attach to the generator g by a universal joint u that will effectively transmit the torque of the telescoping segment c to the generator g at all times when the Drill Bit Corkscrew apparatus is shifting between high tide and low tide and back to high tide. See FIG. 14.

FIG. 14: Universal joint u with extension p will connect the shaft c to the generator g and allow for variable angles so that the torque from the Drill Bit Corkscrew, c can turn the turbines of the generator at a speed which is sufficient to generate electricity. In addition, the telescoping shaft segment c will attach to the generator g by a universal joint u that will effectively transmit the torque of the telescoping segment c to the generator g at all times when the Drill Bit Corkscrew apparatus is shifting between high tide and low tide and back to high tide. See FIG. 14.

Patent Claims

1. An apparatus to use the force and weight of ocean waves to create electricity comprising:
   - a Drill Bit Corkscrew apparatus made from plastic that will turn in a clockwise direction and have one end submerged in ocean waves and be positioned in a direction that is perpendicular to the ocean shore, thirty to 100 meters from where ocean waves are first breaking to the point on a beach where waves dissipate and start their flow back down into the ocean to insert turning power into a generator on the beach that is latched onto the beach and is higher than the salt water line to create electricity,
   - a half-circle upward slanted roof over the Drill Bit Corkscrew apparatus that greatly decreases the weight and force of the wave water that washes over one half of the Drill Bit Corkscrew apparatus,
   - a structure that will allow ocean waves to continually wash over half of the Drill Bit Corkscrew apparatus and put weight on the facets of one half of the Drill Bit Corkscrew apparatus all along the 30-to-100-meter length of the Drill Bit Corkscrew apparatus so that the Drill Bit Corkscrew apparatus turns in a clockwise direction and turns a shaft that goes from the Drill Bit Corkscrew apparatus to a generator and turns the turbines of the generator to create electricity, a holder of the Drill Bit Corkscrew apparatus that attaches to the ocean floor underneath the Drill Bit Corkscrew apparatus to direct the ocean wave water over the length of the Drill Bit Corkscrew apparatus so that water weight will put pressure on the unroofed half of the Drill Bit Corkscrew apparatus so that it turns in a clockwise direction and turns a shaft that goes from the Drill Bit Corkscrew apparatus to a generator and turns the turbines of the generator to create electricity, a holder of the Drill Bit Corkscrew apparatus that holds a slanted-peak roof over the 30 to 100 meter length of the Drill Bit Corkscrew apparatus so that the water weight that falls on that slanted peak roof is directed to the unroofed side of the drill-bit-corkscrew-shaped apparatus so that there is more water weight to turn the facets of the Drill Bit Corkscrew apparatus to give more torque to the shaft that drives the generator and creates electricity, a supporting structure that has two grooves in the structure to form a pathway that will enclose and direct the Drill Bit Corkscrew apparatus, with attached floats, to rise with the ocean water as it increases in height as the ocean water increases to high tide, and then to go back down as the ocean water decreases to low tide, and which supporting structure has grooves that will also be curved to direct the Drill Bit Corkscrew shaped apparatus towards the shore at high tide, and farther away from the shore at low tide, a drive shaft that goes from the Drill Bit Corkscrew apparatus to the generator and be a telescoping shaft of two or more sections that can increase in length as the water goes to low tide, and decrease in length as the water goes to high tide, a drive shaft that has baffles that prevent the different sections of the drive shaft from disconnecting from each other, and move in and out, while still transmitting torque as well as having baffles that conduct the turning power of the shaft as the sections of the shaft telescope in and out to deliver torque to the shaft, a Drill Bit Corkscrew apparatus that is connected to floats that will lift the Drill Bit Corkscrew apparatus as the ocean water increases in height to high tide, and then the floats will lower the Drill Bit Corkscrew shaped apparatus as the ocean water decreases in height to low tide, a generator which is mounted on a latch base to change the angle of the Drill Bit Corkscrew apparatus drive shaft so that the shaft always enters the generator at a right angle to turn the turbines of the generator to create electricity, the telescoping shaft segment c attaches to the generator g by a universal joint u that will effectively transmit the torque of the telescoping segment c to the generator g at all times when the Drill Bit Corkscrew apparatus is shifting between high tide and low tide and back to high tide.

2. An apparatus according to claim 1, further comprising that the ocean-waves originating end of the Drill Bit Corkscrew apparatus is connected to a supporting bar structure that has two ends running perpendicular to the Drill Bit Corkscrew apparatus so that the two ends fit into, and are contained in, pathways in the two sides of the holder of the Drill Bit Corkscrew apparatus and are contained in the pathways so that the ocean waves do not wash the Drill Bit Corkscrew apparatus into the shore.

3. An apparatus according to claim 1, further comprising multiple Drill Bit Corkscrew apparatuses that are combined to make a larger, more powerful combined electricity flow and that allow any one of the Drill Bit Corkscrew apparatuses to be disconnected from the continuing power generation of the others to replace any nonfunctioning parts before returning that repaired Drill Bit Corkscrew apparatus to service.

The invention claimed is:

1. An apparatus to use the force and weight of ocean waves to create electricity comprising:

a Drill Bit Corkscrew apparatus made from plastic that will turn in a clockwise direction and have one end submerged in ocean waves and be positioned in a direction that is perpendicular to the ocean shore, thirty to 100 meters from where ocean waves are first breaking to the point on a beach where waves dissipate and start their flow back down into the ocean to insert turning power into a generator on the beach that is latched onto the beach and is higher than the salt water line to create electricity, a half-circle upward slanted roof over the Drill Bit Corkscrew apparatus that greatly decreases the weight and force of the wave water that washes over one half of the Drill Bit Corkscrew apparatus, a structure that will allow ocean waves to continually wash over half of the Drill Bit Corkscrew apparatus and put weight on the facets of one half of the Drill Bit Corkscrew apparatus all along the 30-to-100-meter length of the Drill Bit Corkscrew apparatus so that the Drill Bit Corkscrew apparatus turns in a clockwise direction and turns a shaft that goes from the Drill Bit Corkscrew apparatus to a generator and turns the turbines of the generator to create electricity, a holder of the Drill Bit Corkscrew apparatus that attaches to the ocean floor underneath the Drill Bit Corkscrew apparatus to direct the ocean wave water over the length of the Drill Bit Corkscrew apparatus so that water weight will put pressure on the unroofed half of the Drill Bit Corkscrew apparatus so that it turns in a clockwise direction and turns a shaft that goes from the Drill Bit Corkscrew apparatus to a generator and turns the turbines of the generator to create electricity, a holder of the Drill Bit Corkscrew apparatus that holds a slanted-peak roof over the 30 to 100 meter length of the Drill Bit Corkscrew apparatus so that the water weight that falls on that slanted peak roof is directed to the unroofed side of the drill-bit-corkscrew-shaped apparatus so that there is more water weight to turn the facets of the Drill Bit Corkscrew apparatus to give more torque to the shaft that drives the generator and creates electricity, a supporting structure that has two grooves in the structure to form a pathway that will enclose and direct the Drill Bit Corkscrew apparatus, with attached floats, to rise with the ocean water as it increases in height as the ocean water increases to high tide, and then to go back down as the ocean water decreases to low tide, and which supporting structure has grooves that will also be curved to direct the Drill it Corkscrew shaped apparatus towards the shore at high tide, and farther away from the shore at low tide, a drive shaft that goes from the Drill Bit Corkscrew apparatus to the generator and be a telescoping shaft of two or more sections that can increase in length as the water goes to low tide, and decrease in length as the water goes to high tide, a drive shaft that has baffles that prevent the different sections of the drive shaft from disconnecting from each other, and move in and out, while still transmitting torque as well as having baffles that conduct the turning power of the shaft as the sections of the shaft telescope in and out to deliver torque to the shaft, a Drill Bit Corkscrew apparatus that is connected to floats that will lift the Drill Bit Corkscrew apparatus as the ocean water increases in height to high tide, and then the floats will lower the Drill Bit Corkscrew shaped apparatus as the ocean water decreases in height to low tide, a generator which is mounted on a latch base to change the angle of the Drill Bit Corkscrew apparatus drive shaft so that the shaft always enters the generator at a right angle to turn the turbines of the generator to create electricity, the telescoping shaft segment c attaches to the generator g by a universal joint u that will effectively transmit the torque of the telescoping segment c to the generator g at all times when the Drill Bit Corkscrew apparatus is shifting between high tide and low tide and back to high tide.

2. An apparatus according to claim 1, further comprising that the ocean-waves originating end of the Drill Bit Corkscrew apparatus is connected to a supporting bar structure that has two ends running perpendicular to the Drill Bit Corkscrew apparatus so that the two ends fit into, and are contained in, pathways in the two sides of the holder of the Drill Bit Corkscrew apparatus and are contained in the pathways so that the ocean waves do not wash the Drill Bit Corkscrew apparatus into the shore.

3. An apparatus according to claim 1, further comprising multiple Drill Bit Corkscrew apparatuses that are combined to make a larger, more powerful combined electricity flow and that allow any one of the Drill Bit Corkscrew apparatuses to be disconnected from the continuing power generation of the others to replace any nonfunctioning parts before returning that repaired Drill Bit Corkscrew apparatus to service.

* * * * *